US008485500B2

(12) United States Patent
Nunley

(10) Patent No.: US 8,485,500 B2
(45) Date of Patent: Jul. 16, 2013

(54) CURTAIN DOOR INSTALLATION SYSTEM

(76) Inventor: Charles L. Nunley, Lake in the Hills, IL (US)

( * ) Notice: Subject to any disclaimer, the term of this patent is extended or adjusted under 35 U.S.C. 154(b) by 338 days.

(21) Appl. No.: 12/847,886

(22) Filed: Jul. 30, 2010

(65) Prior Publication Data

US 2011/0027055 A1 Feb. 3, 2011

Related U.S. Application Data

(60) Provisional application No. 61/213,929, filed on Jul. 30, 2009.

(51) Int. Cl.
*B60P 1/14* (2006.01)

(52) U.S. Cl.
USPC ........................ 254/4 R; 254/2 B; 254/133 R

(58) Field of Classification Search
USPC ................ 254/2 B, 4 R, 4 B, 8 R, 133 R, 134
See application file for complete search history.

(56) References Cited

U.S. PATENT DOCUMENTS

| | | | | | |
|---|---|---|---|---|---|
| 2,985,430 | A * | 5/1961 | Greenwood | .................. | 254/338 |
| 4,153,221 | A | 5/1979 | Howard | | |
| 4,170,340 | A * | 10/1979 | Mouton, Jr. | .................. | 254/386 |
| 4,251,039 | A | 2/1981 | Howard | | |
| 4,485,894 | A * | 12/1984 | Soule et al. | .................. | 187/229 |
| 4,856,767 | A * | 8/1989 | Wood | .................. | 269/46 |
| 2003/0029960 | A1 | 2/2003 | Boone et al. | | |
| 2008/0135669 | A1 | 6/2008 | Kostigian | | |
| 2009/0127527 | A1* | 5/2009 | Hoffend, III | .................. | 254/338 |
| 2011/0027055 | A1* | 2/2011 | Nunley | .................. | 414/659 |

* cited by examiner

*Primary Examiner* — Lee D Wilson
(74) *Attorney, Agent, or Firm* — Spencer Fane Britt & Browne LLP

(57) ABSTRACT

A cradle for supporting and installing a rolled curtain door comprises rollers configured to support, and permit rolling, of a rolled curtain door thereon. Extensions with rollers permit the cradle to support rolled curtain doors of varying length. A motor may be connected to the rollers to assist in rotating the door. The cradle may be mounted on the tines of a fork on a lifting device. A lift assembly having a tower and base may be attached to the cradle for manually positioning, and mechanically elevating the cradle and door when installing the door. The tower is extended by a piston-and-cylinder unit. A winch motor and cable, or a boom hoist attached to the tower may be used to load a door onto the cradle.

11 Claims, 4 Drawing Sheets

CURTAIN DOOR INSTALLATION SYSTEM

CROSS-REFERENCE TO RELATED APPLICATIONS

This application claims priority in U.S. Provisional Patent Application No. 61/213,929, filed Jul. 30, 2009, which is incorporated herein by reference.

BACKGROUND OF THE INVENTION

1. Field of the Invention

The present disclosed technology relates generally to a rolled door installation device, and in particular a cradle for holding a rolled curtain door and a system for installing the door above an opening.

2. Description of the Related Art

Curtain door systems for residential and commercial use provide a movable barrier to cover a window or opening in a wall. The door systems may be manufactured to cover windows or openings having a wide variety of widths and heights. Curtain door systems are used in a variety of applications such as preventing the spread of fire in occupied structures, providing security to protect windows and doorways, and to cover large openings in walls where the use of large paneled doors is cumbersome or impractical such as openings for the passage of vehicles.

A curtain door system generally includes a curtain door having a series of interlocking slats of metal or plastic that spans an opening. The curtain door mounts above an opening or window on mounting hardware, and during operation is guided into position by guide rails at the periphery of the opening. The mounting hardware may include a pipe or drum that rotates between two head plates, and from which the curtain door is suspended. The interlocking feature of the slats allows the curtain door to be rolled about the pipe or drum when opening or closing the curtain door. Manufacturers typically ship curtain doors with the curtain door wound about the pipe or drum, or connected to the mounting hardware and drive mechanism. However, installation of the curtain door may be performed after installation of the guide rails, pipe, mounting hardware, and drive mechanism.

Rolled curtain doors are often heavy and awkward to install. Conventional installation methods require suspending the rolled curtain door below the pipe using slings or ropes. Workers pull on the ropes to lift the door up to the pipe for attachment. Workers next ascend ladders and manually adjust the orientation of the rolled door to align the top slat with the pipe, and connect the two. The curtain door is then rolled off of the ropes and onto the pipe. As a result, the conventional tools and process used to install curtain doors is fraught with challenges, especially when installing doors that weigh hundreds of pounds, or used to cover large openings having great height or width. Moreover, the conventional installation process can lead to injury of the workers installing the door because of a need to use body strength and ladders to complete installation. Therefore, there is a need for a curtain door installation system that permits a worker to safely and accurately install a curtain door regardless of the height of the opening the door will cover, and the size and weight of the door.

Therefore, those who install curtain door systems desire an installation tool that provides an efficient and safe method for installing these systems. The disclosed subject matter provides these features and advantages.

SUMMARY OF THE INVENTION

In accordance with the invention, a rolled curtain door may be supported by an adjustable cradle having rollers, that are configured to support the curtain door and permit rolling of the door thereon to aid in mounting the door to mounting hardware. The cradle has extensions with rollers that may be extended, thereby allowing the cradle to support rolled curtain doors of varying length. The cradle may be mounted on the tines of a fork on a lifting device, such as a forklift or lifting assembly, to raise raising the curtain door up to a mounting position on a wall above a door opening. Optionally, the rollers may be powered by a motor to rotate the door and assist in mounting it to door hardware.

If desired, particular embodiments may optionally include a lift assembly attached to the cradle. The lift assembly includes a tower extendable by a piston and cylinder unit. The tower has a fork with tines projecting therefrom. The tower is attached to a base having casters for manually rolling the cradle and lift assembly around a worksite. Stabilizers on the base may be used to support and level the assembly when in use. A winch motor with a cable is attached to the tower and may be used to assist in loading a rolled curtain door onto the cradle. Optionally, a hoist attached to the tower may be used to load a rolled curtain door onto the cradle.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION OF THE PREFERRED EMBODIMENT

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. Said terminology will include the words specifically mentioned, derivatives thereof and words of similar meaning.

Figure 1:
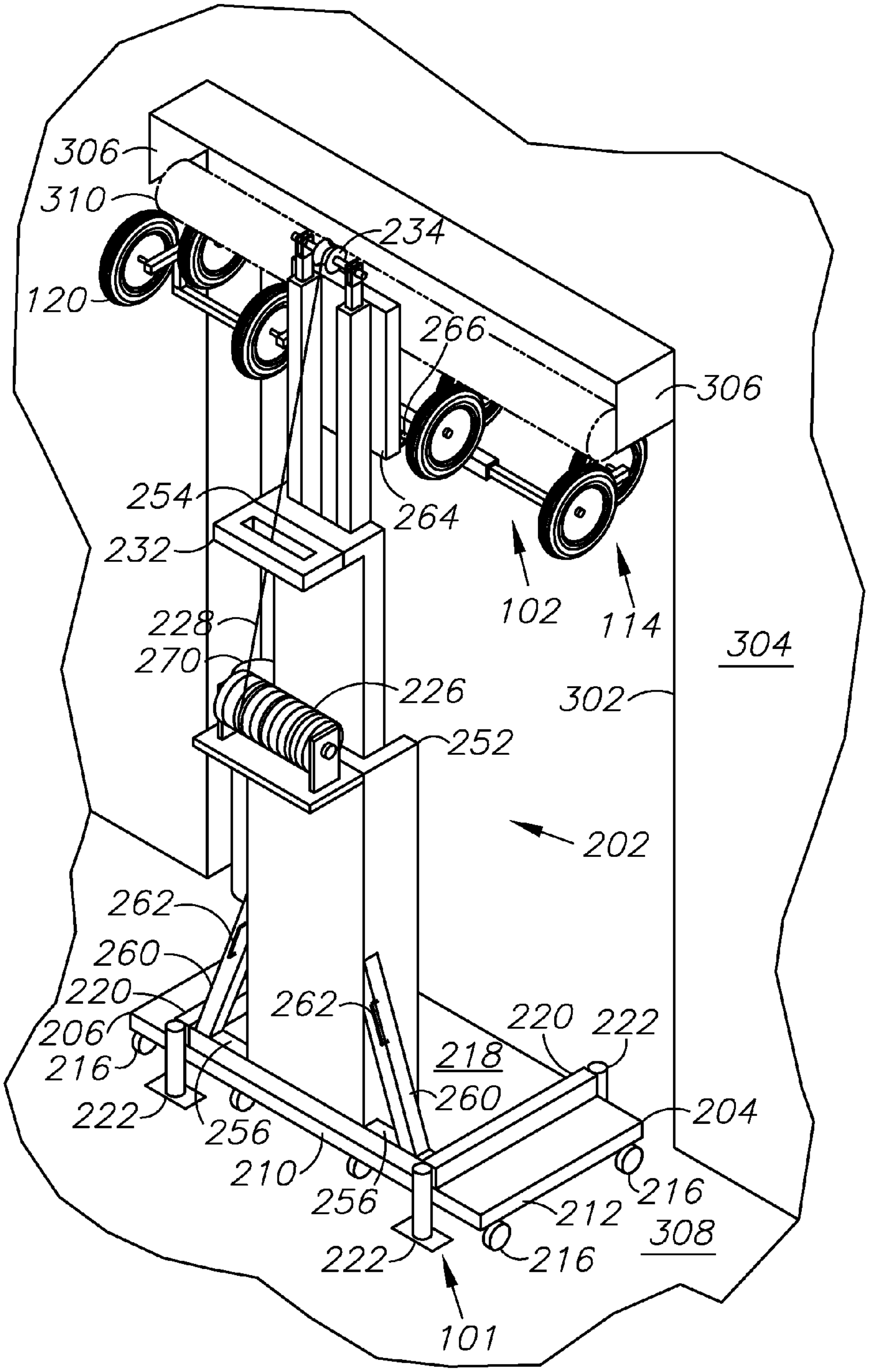
FIG. 1 is a rear perspective view of a first alternative embodiment curtain door installation system embodying principles of the disclosed subject matter where a cradle supporting a rolled curtain door is attached to, and elevated by, a lifting device.
Figure 2:
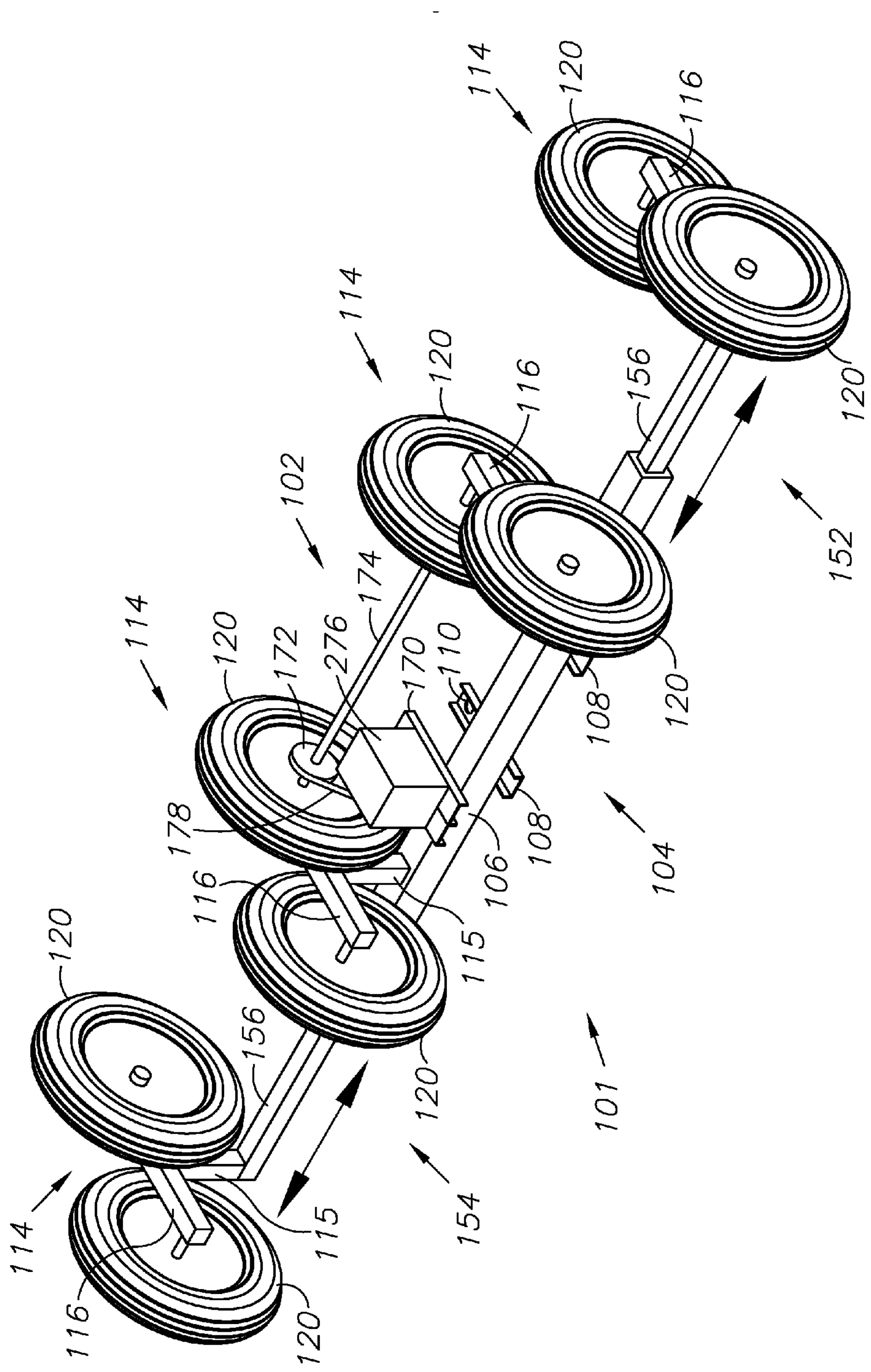
FIG. 2 is a rear perspective view of the curtain door installation system embodying principles of the disclosed subject matter showing the cradle with extensions assemblies extended from a central assembly.
Figure 3:
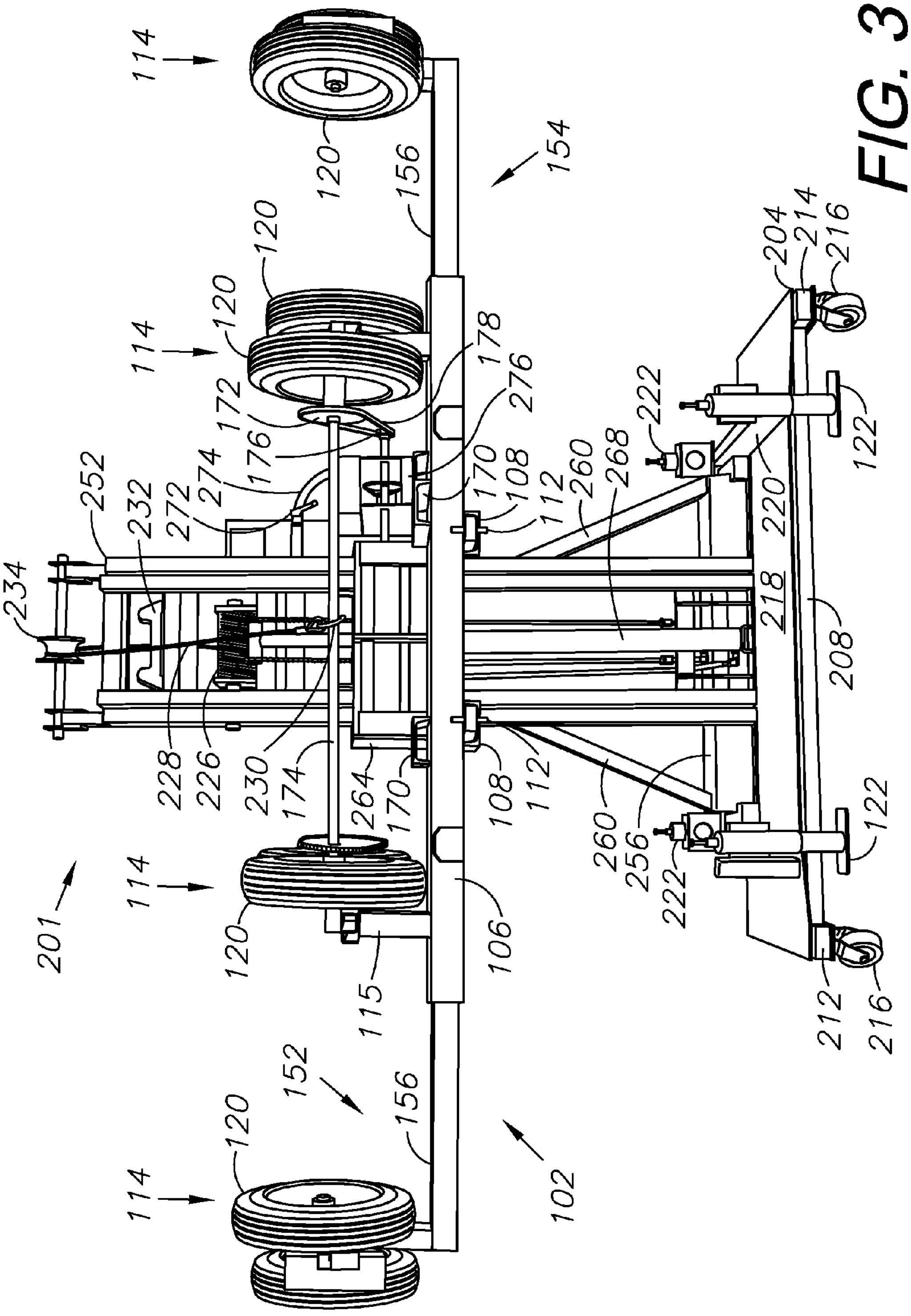
FIG. 3 is a front elevational view of the cradle attached to a lifting device.

Referring to the drawings in more detail, the reference numeral 101 generally designates a curtain door installation system embodying the principles of the disclosed subject matter. Referring to FIG. 2, the system 101 generally includes a cradle 102 having a central assembly 104, and first and second extension assemblies 152 and 154. By way of example, and not to be construed as limiting, the system 101 is shown in FIG. 1 attached to a lift assembly 202, and elevated, for installing the rolled curtain door 310 above an opening 302 in a wall 304. A rolled door system generally includes a curtain door 310 attached to a pipe or drum located between two head plates 306, a drive mechanism for raising and lowering the curtain door 310, and guide rails for keeping the curtain door 310 aligned with the opening during operation.

Referring to FIG. 2, cradle 102 generally comprises a central assembly 104, and first and second extension assemblies 152 and 154. Central assembly 104 includes a cross member 106 having a pair of fork sleeves 108 secured to the underside, and two roller assemblies 114 secured to the top. Cross member 106 may comprise a hollow steel tube with opposite open ends, and having a rectangular cross section for slidably receiving a leg 156 of first or second extension assemblies 152 and 154. Cross member 106 is the part that supports the roller assemblies 114, and for mounting first and second extension assemblies 152 and 154. Fork sleeves 108 comprise a steel tube having a rectangular cross section, and dimensioned to slidably receive the tines of a fork from a lifting device including, but not limited to, lift assembly 202, a forklift or a lift truck (not shown). Each fork sleeve 108 has an aperture 110 for receiving a locking member such as a locking pin or a set bolt 112 to secure cradle 102 to the fork of the lifting device. Alternatively, fork sleeves 108 may be welded to the fork.

Each roller assembly 114 includes an arm 116 mounting two rollers that are opposite each other and allow free rotation of the roller thereon. The roller may include, but is not limited to, a metal, plastic, or composite drum, wheel, or tube, preferably a wheel 120 having a rubber contact surface. Wheels 120 are mounted on arm 116 by a vertical support 115, wherein the rotational axis of wheel 120 is perpendicular to arm 116, and wheel 120 is spaced a sufficient distance apart as to cradle a rolled curtain door 310. Although a wheel 120 is shown and described, any suitable roller or rollers may be used with cradle 102 that permits free rotation of the rolled curtain door 310 thereon. Roller assemblies 114 are mounted with arm 116 perpendicular to cross member 106, thereby supporting rolled curtain door 310 parallel to cross member 106. The fork sleeves 108, cross member 106, vertical support 115, and roller assemblies 114 are secured by welding, or alternatively, by fasteners such as a nut and bolt combination.

Cradle 102 may suitably function with or without first and second extension assemblies 152 and 154. Extension assemblies 152 and 154 may be connected to central assembly 104 when supporting an especially wide or heavy curtain doors 310. First extension assembly 152 includes leg 156 mounting roller assembly 114 at one end. Leg 156 comprises a solid or hollow steel tube having a rectangular cross section adapted for insertion into cross member 106. Roller assembly 114 may be secured to leg 156 by a pair of U-bolts 158, nuts 160, and a plate 162, or alternatively by welding.

Second extension assembly 156 is generally identical to first extension assembly 152 and therefore will not be described. Leg 146 end opposite roller assembly 114 is inserted into the open end of cross member 106 with roller assembly 114 facing up, and are slid in and out as needed to position first and second roller assemblies 114 under the rolled curtain door 310.

Cradle 102 may optionally be powered by a motor 276 that can rotate wheels 120 thereby rotating the rolled curtain door 310 thereon when mounting the curtain door 310 above an opening. Roller assemblies on cross member 106 may be connected by a shaft 174 having a driven sprocket 172. Driven sprocket 172 is connected to a drive sprocket 176 on motor 276 by a chain 178. Motor 276 is mounted on either lift assembly 202 or cross member 106, preferably lift assembly 202. Motor 276 may be an electrical motor powered by a suitable electrical power supply, or a hydraulic motor powered by an complimentary power source.

In use, cradle 102 is mated to a lifting device having a pair of forks projecting therefrom. The forks are inserted into fork sleeves 108, and cradle 102 is secured to the forks by tightening set bolts 112 in apertures 110. First and second extension assemblies 152 and 154 are adjusted or removed, as needed, to properly support a rolled curtain door 310. A curtain door 310 is then loaded onto cradle 102, and cradle 102 is then raised up to the proper height above an opening where the rolled curtain door 310 is attached to the installed door mounting hardware such as a pipe or drum. After the rolled curtain door 310 is attached to the mounting hardware, roller assemblies 114 allow free rotation of the curtain door 310 off of the cradle 102 as the curtain door 310 is rolled onto the pipe or drum, or motor 276 may be engaged to rotate wheels 120 to assist in transferring the rolled curtain door 310 to the door mounting hardware.

Occasionally a rolled curtain door 310 may already be attached to mounting hardware and a drive mechanism. Therefore, although a rolled curtain door 310 is described, cradle 102 may be used to install a rolled curtain door above a doorway when the rolled curtain door already has its mounting hardware installed using the same process describe above.

Supporting the rolled curtain door 310 with cradle 102, and using roller assemblies 114 to transfer the curtain door 310 to the mounting hardware avoids the perils previously encountered when installing curtain doors. Namely, workers can avoid use of straps, step ladders, and body strength currently necessary to suspend and raise heavy curtain door below its mounting hardware. This provides workers with a tool to safely and accurately install a curtain door regardless of the height or location of the mounting hardware, and the size or weight of the door.

A curtain door installation system comprising a first alternative embodiment curtain door installation system 201 is shown in FIGS. 1 and 2, and includes a cradle 102 attached to lift assembly 202. Lift assembly generally comprises a tower 252 connected to a base 204. The generally rectangular base 204 includes a frame 206 constructed of tubular members having a rectangular cross section. Frame 206 comprises a rectangle having front and rear members 208 and 210, and interconnecting side members 212 and 214. The ends of front and rear members 208 and 210 are joined to their respective side members 212 and 214 in a conventional manner such as by welding. Base 204 is supported by casters 216 secured to frame 206 allowing lift assembly 202 to be rolled around a worksite by a worker.

A deck 218 is secured to frame 206 and provides a mounting surface for two deck ribs 220. Each deck rib 220 is located on top of deck 218 adjacent to a side member 212 and 214. Ribs 220 comprise a solid or hollow steel tube having a rectangular cross section, and traverse deck 218 from front to back adding rigidity to base 204. The front and rear of each rib 220 provides a mounting surface for a stabilizer 222 used to bias against the surface supporting lift assembly 202, thereby stabilizing and holding lift assembly 202 when in use. Stabilizer 222 may be a conventional manually-operated stabilizer, or a mechanical stabilizer operated using electric or hydraulic power.

Tower 252 generally comprises an extendable mast 254 that raises and lowers a fork 266. Mast 254 is centered at the rear of base 204 and secured thereto by welding. Mast 254 is further secured to base 204 by a heel 256 that is secured to both deck 218 and mast 254 by welding, completing formation of a rigid box-like structure that adds further stability to the connection between base 204 and mast 254. Mast 254 is further stabilized by angular trusses 260 secured to mast 254 at one end, and base 204 at the other end by welding. A handle 262 on the rear of each truss 260 permits a worker to manually maneuver lift assembly 202.

Mast 254 comprises interlocking rails supporting a carriage 264 and a forward-facing fork 266. Mast 254 functions in a similar manner as those found on a forklift truck for raising and lowering carriage 264 and fork 266. Mast 254 is raised and lowered by a piston and cylinder unit (p-c unit) 268 connected at one end to base 204 and at another end to mast 254 by a chain. P-c unit 268 communicates with a reservoir 270 via a valve 272 and hose 274. P-c unit 268 may function using a pneumatic system or a hydraulic system, preferably a pneumatic system. Actuation of valve 272 to a first position extends p-c unit 268 and raises fork 266. Actuation of valve 272 to a second position ceases movement of p-c unit 268. Actuation of valve 272 to a third position withdraws p-c unit 268 and lowers fork 266.

A winch motor 226 winds-up and lets out a cable 228 having a hook 230 for connecting to a rolled curtain door 310. Cable 228 passes through a guide 232 keeping cable 228 aligned with winch motor 226 and a wheel 234 disposed at the top of the mast 254. Wheel 234 allows for cable 228 to roll on when lifting a rolled curtain door 310 onto cradle 102.

In use, curtain door installation system 201 provides for installation of a rolled curtain door 310 without the need of a forklift truck. Cradle 102 is attached to fork 266 of the lift assembly 202 in the same manner as described above. First and second extension assemblies 152 and 154 are adjusted or removed as needed depending on the size or weight of the rolled curtain door 310. After loading a rolled curtain door 310 onto cradle 102 using cable 228 and winch 226, lift assembly 202 may be freely rolled across a surface. Using handles 262, a worker can manually position lift assembly 202 and curtain door 310 below an opening to be covered. After engaging stabilizers 222 to immobilize and level lift assembly 202, a worker actuates valve 272 to the first position to raise fork 266 and cradle 102. When cradle 102 has reached the proper height to offload the rolled curtain door 310 to the mounting hardware, valve 272 is moved to the second position stopping movement of cradle 102. After the curtain door 310 is offloaded, valve 272 is moved to the third position permitting cradle 102 to be lowered to the ground.

Figure 4:
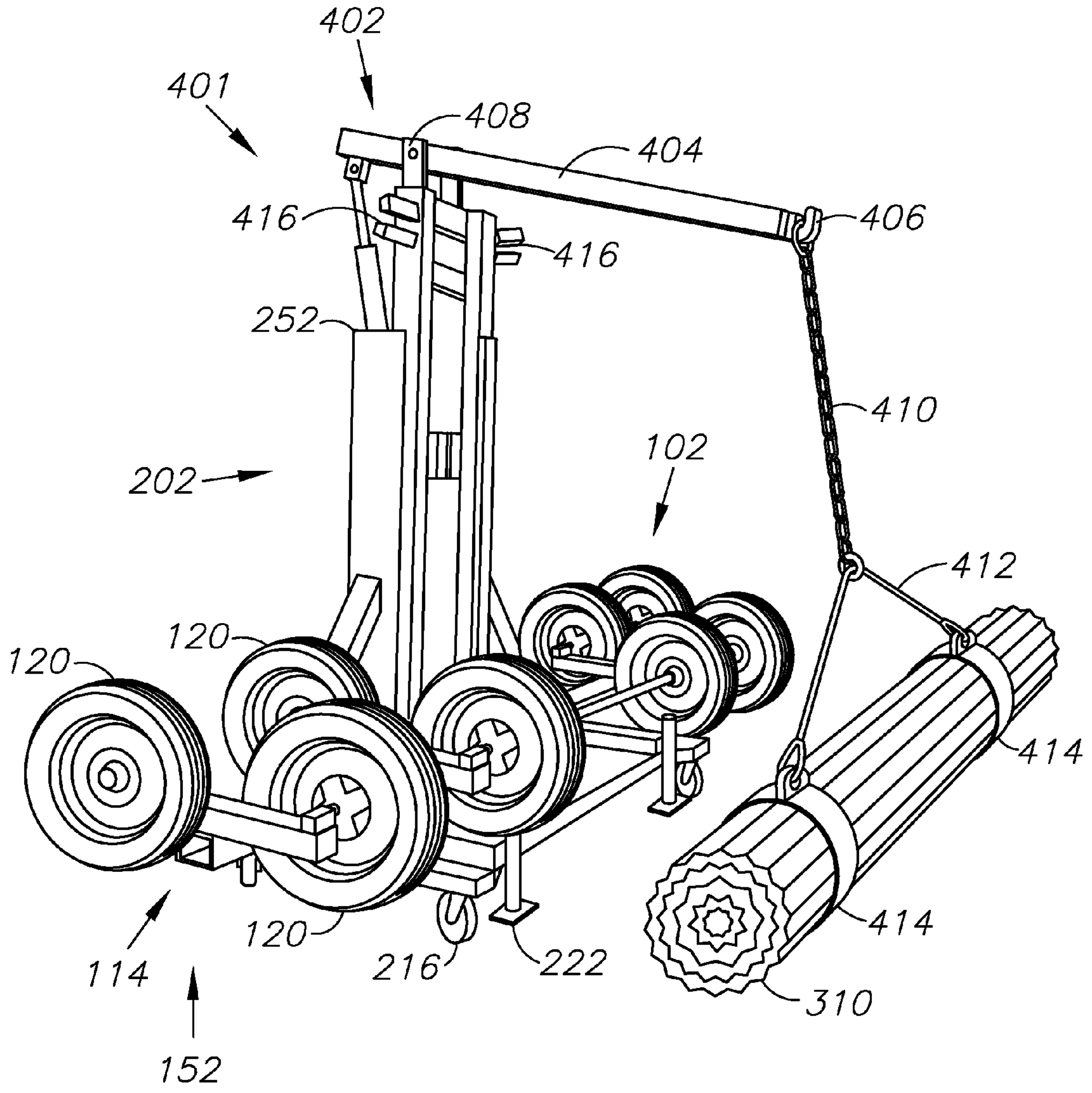
FIG. 4 is a second alternative embodiment curtain door installation system including a cradle attached to a lift with an integrated hoist.

A curtain door installation system comprising a second alternative embodiment curtain door installation system 401 is shown in FIG. 4, and includes cradle 102 and lift assembly 202 as described above, and further including hoist 402. Hoist 402 is attached to the top of tower 252 for assisting in loading a rolled curtain door 310 onto cradle 102. Hoist 402 generally includes a boom 404 that pivots atop tower 252, and a p-c unit 418 for raising and lowering boom 404. Boom 404 extends forward from the rear of lift assembly 202 across the top of tower 252, terminating in front of lift assembly 202. Boom 404 may comprise a hollow steel tube having a rectangular cross section. Boom 404 pivots about a bracket 408 extending from the top of tower 252. P-c unit 418 attaches at one end to the rear of boom 404, and at another end to tower 252. P-c unit 418 may function in a similar manner, and use like components, as p-c unit 268 described above. A hook 406 at the forward end of boom 404 allows for connection of a chain 410. Straps 414 may be wrapped around the rolled curtain door 310 and connected to the free end of chain 410 by a cable 412. Optionally, electrically-powered lights 416 may be attached to tower 252 providing illumination of cradle 102 and workspace.

In use, the rolled curtain door 310 is connected to the hoist 402 as described above. Actuation of p-c unit lifts the rolled curtain door 310 off of the ground or a vehicle. Workers may then guide the rolled curtain door 310 over cradle 102 and lower boom 404 thereby placing the door 310 between wheels 120 of the cradle 102. Rolled curtain door 310 is then disconnected from hoist 402, and raised into position on cradle 102 for installation.

It will be appreciated that the components of cradle 102 and installation systems 101, 201, and 401 may be used for various other applications. Moreover, cradle 102 and installation systems 101, 201, and 401 may be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

The invention claimed is:

1. A system for supporting a rolled curtain door including a cradle and a lifting device, said cradle comprising:

a first elongated member having first and second ends;

a first rolling assembly including a pair of rollers, said rollers positioned opposite each other and attached to said first end of said first elongated member;

a second rolling assembly including a pair of rollers, said rollers positioned opposite each other and attached to said second end of said first elongated member;

a first extension assembly, comprising:

a first leg having first and second ends;

a third rolling assembly including a pair of rollers, said rollers positioned opposite each other and attached to said first end of said first leg; and said first end of said first elongated member adapted to slidably receive said first extension assembly.

2. A cradle as claimed in claim 1, further comprising:

a second extension assembly, comprising:

a second leg having first and second ends;

a fourth rolling assembly including a pair of rollers, said rollers positioned opposite each other and attached to said first end of said second leg; and said second end of said first elongated member adapted to slidably receive said second extension assembly.

3. A cradle as claimed in claim 1, further comprising a motor connected to said first rolling assembly for rotating said rollers.

4. A cradle as claimed in claim 3, further comprising:

a shaft connecting a roller of said first and second roller assembly;

a driven sprocket attached to said shaft for rotating said shaft;

a drive sprocket attached to said motor; and a chain connecting driven sprocket and said drive sprocket.

5. A cradle as claimed in claim 4, wherein said motor is an electric motor.

6. A cradle as claimed in claim 4, wherein said motor is a hydraulic motor.

7. A system for supporting a rolled curtain door as claimed in claim 3, wherein said lifting device comprises:

a base connected to a tower;

(a) said base including;

(i) a frame;

(ii) a plurality of casters attached to the bottom of said frame;

(iii) a stabilizer attached to said frame;

(b) said tower including;

(i) an extendable mast; and (ii) a fork having a tine extending from said mast, said sleeve mounted on said tine.

8. A lifting device as claimed in claim 7, further comprising:

a winch motor attached to said tower for lifting a rolled curtain door; and a cable attached to said winch motor for connecting to said rolled curtain door.

9. A lifting device as claimed in claim 7, further comprising:

a boom having a rear end and a front end, said boom connected to the top of said tower for lifting a rolled curtain door; and a piston-and-cylinder unit attached to said boom rear end and said tower for actuating said boom.

10. A system for supporting a rolled curtain door as claimed in claim 3, wherein said lifting device comprises a forklift.

11. A system for installing a rolled curtain door, comprising:

a cradle assembly for supporting said rolled curtain door, said cradle assembly including;

(a) a tubular first elongated member having opposite ends;

(b) a second elongated member having opposite ends, said second elongated member attached perpendicular to said first elongated member end;

(c) a first wheel having a rotational axis, said first wheel rotatably attached to each of said second elongated member end, said rotational axis being parallel to said first elongated member;

(d) a third elongated member having a first end and a second end, said third elongated member first end slidably received within an end of said first elongated member;

(e) a fourth elongated member having opposite ends, said fourth elongated member attached perpendicular to said third elongated member at said third elongated member second end;

(f) a second wheel having a rotational axis, said second wheel rotatably attached to each of said elongated member end, said wheel rotational axis being parallel to said third elongated member;

a lift assembly comprising a base connected to a tower;

(a) said base including;

(i) a deck having a top, a bottom, a front edge, a rear edge, and opposing side edges;

(ii) a pair of tubular side frames attached to the bottom of said deck;

(iii) a front and a rear tubular frame attached to the bottom of said deck;

(iv) a plurality of casters attached to the bottom of said front frame, said rear frame, and said side frames;

(v) an elongated rib attached to said top of said deck extending between said front edge and said rear edge of said deck;

(vi) a stabilizer attached to said rib at each of said deck front edge and said deck rear edge;

(b) said tower including;

(i) a mast having interlocking rails, said mast being extendable;

(ii) a carriage attached to one of said interlocking rails;

(iii) a fork having a tine extending from said carriage;

(iv) a truss attached to said mast and said base;

(v) a heel plate attached to said mast and said base;

(vi) a piston and cylinder unit attached to said mast and said base for raising and lowering said fork; and a sleeve adapted to receive said tine of said fork, said sleeve including an aperture adapted to receive a locking member, said sleeve attached perpendicular to said first elongated member.

* * * * *